(12) United States Patent
Kadi et al.

(10) Patent No.: US 10,987,659 B1
(45) Date of Patent: Apr. 27, 2021

(54) SYNTHESIS OF TIO2/CO3O4 CORE-SHELL PHOTOCATALYSTS

(71) Applicant: King Abdulaziz University, Jeddah (SA)

(72) Inventors: Mohammad W. Kadi, Jeddah (SA); Reda M. Mohamed Ouf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/089,917

(22) Filed: Nov. 5, 2020

(51) Int. Cl.
*C01B 3/00* (2006.01)
*C01B 4/00* (2006.01)
(Continued)

(52) U.S. Cl.
CPC ............ *B01J 23/75* (2013.01); *B01J 19/127* (2013.01); *B01J 21/063* (2013.01); *B01J 23/42* (2013.01); *B01J 35/004* (2013.01); *B01J 35/0013* (2013.01); *B01J 35/1019* (2013.01); *B01J 37/0203* (2013.01); *B01J 37/0205* (2013.01); *B01J 37/0221* (2013.01); *B01J 37/0228* (2013.01); *B01J 37/0248* (2013.01); *B01J 37/036* (2013.01); *B01J 37/086* (2013.01);
(Continued)

(58) Field of Classification Search
CPC ...... B01J 23/75; B01J 37/086; B01J 35/1019; B01J 19/127; B01J 37/0248; B01J 37/0221; B01J 37/0203; B01J 37/0205; B01J 37/088; B01J 37/0228; B01J 37/036; B01J 35/0013; B01J 35/004; B01J 21/063; B01J 23/42; B01J 2219/1203; B01J 2219/0877; B01J 2219/0892; C01B 3/042
USPC ..................................................... 204/157.52
See application file for complete search history.

(56) References Cited

U.S. PATENT DOCUMENTS

2010/0264097 A1* 10/2010 Sun ..................... B01J 35/1076
 210/767
2018/0162801 A1* 6/2018 Kadi ....................... B01J 13/02

OTHER PUBLICATIONS

Li et al., "Engineering the Formation of Secondary Building Blocks within Hollow Interiors" Advanced Materials, vol. 24, Issue11 Mar. 15, 2012 pp. 1424-1428 (Year: 2012).*
(Continued)

*Primary Examiner* — Haytham Soliman
(74) *Attorney, Agent, or Firm* — W&C IP

(57) ABSTRACT

A method of synthesizing $TiO_2/Co_3O_4$ core-shell photocatalysts is provided. The method includes preparing $SiO_2$ hollow nanospheres via sol-gel synthesis in the presence of a triblock copolymer surfactant and a cationic surfactant; adding titanium sec-butoxide to a solution containing the $SiO_2$ hollow nanospheres to provide a first combined sample; calcinating the first combined sample to provide hollow mesoporous $TiO_2$ nanospheres; adding cobalt nitrate to a solution comprising the hollow mesoporous $TiO_2$ nanospheres to provide a second combined sample; and calcinating the second combined sample to provide $TiO_2/Co_3O_4$ core-shell photocatalysts. Methods of producing hydrogen by water-splitting using $TiO_2/Co_3O_4$ core-shell photocatalysts are also provided. Such methods include photodepositing platinum onto the photocatalysts during the reaction.

3 Claims, 10 Drawing Sheets
(3 of 10 Drawing Sheet(s) Filed in Color)

(51) Int. Cl.
*C01B 6/00* (2006.01)
*B01J 23/75* (2006.01)
*B01J 23/42* (2006.01)
*B01J 35/00* (2006.01)
*B01J 35/10* (2006.01)
*B01J 37/03* (2006.01)
*B01J 37/02* (2006.01)
*B01J 37/08* (2006.01)
*B01J 19/12* (2006.01)
*C01B 3/04* (2006.01)
*B01J 21/06* (2006.01)

(52) U.S. Cl.
CPC ............ B01J 37/088 (2013.01); C01B 3/042 (2013.01); *B01J 2219/0877* (2013.01); *B01J 2219/0892* (2013.01); *B01J 2219/1203* (2013.01)

(56) References Cited

OTHER PUBLICATIONS

Li et al., Supporting Material of "Engineering the Formation of Secondary Building Blocks within Hollow Interiors" Advanced Materials, vol. 24, Issue11 Mar. 15, 2012 pp. 1424-1428 (Year: 2012).*

Soares et al., "The controlled synthesis of complex hollow nanostructures and prospective applications" Proc. R. Soc. A .47520180677 (2019) https://doi.org/10.1098/rspa.2018.0677 (Year: 2019).*

Fakhari et al., "Thermogelling properties of purified poloxamer 407", Heliyon 3 (2017) e00390.

Gregory et al., "Template-Induced Structuring and Tunable Polymorphism of Three-dimensionally Ordered Mesoporous (3DOm) Metal Oxides", Langmuir, Jun. 12, 2017.

Li et al., "Engineering a hetero-MOF-derived TiO2-Co3O4 heterojunction decorated with nickel nanoparticles for enhanced photocatalytic activity even in pure water", CrystEngComm, Issue 34 , 2020.

Maeda, "Photocatalytic properties of rutile TiO2 powder for overall water splitting", Catalysis Science & Technology, Issue 7, 2014.

Naldoni et al., "Porous TiO2 microspheres with tunable properties for photocatalytic air purification", Ultrasonics Sonochemistry 20 (2013) 445-451.

Rahman et al., "Synthesis of Silica Nanoparticles by Sol-Gel: Size-Dependent Properties, Surface Modification, and Applications in Silica-Polymer Nanocomposites—A Review", Journal of Nanomaterials, 2012, Article ID 132424.

Yan et al., "Exploring the Effect of Porous Structure on Thermal Conductivity in Templated Mesoporous Silica Films", J. Phys. Chem. C (2019), 123, 35, 21721-21730.

Yu et al., "Synthesis of hollow TiO2@g-C3N4/Co3O4 core-shell microspheres for effective photooxidation degradation of tetracycline and MO", Ceramics International, vol. 46, Issue 9, Jun. 15, 2020, pp. 13133-13143.

Zhang et al., "Synthesis of p-Co3O4/n-TiO2 Nanoparticles for Overall Water Splitting under Visible Light Irradiation", Nanomaterials, 2016, 6, 138.

* cited by examiner

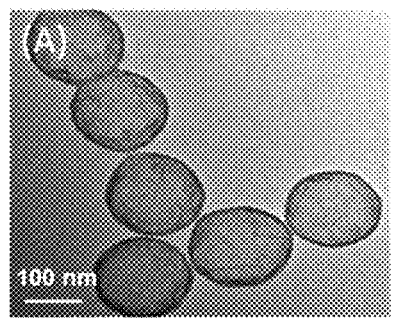 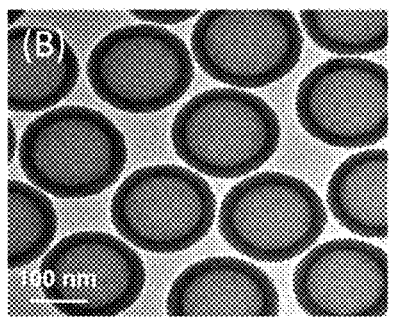 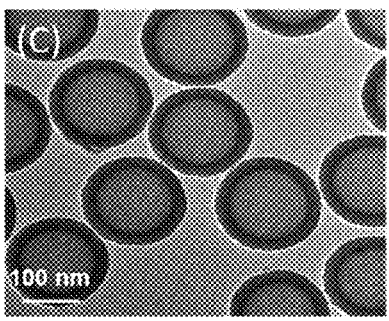
FIG. 4A　　　　　　　FIG. 4B　　　　　　　FIG. 4C
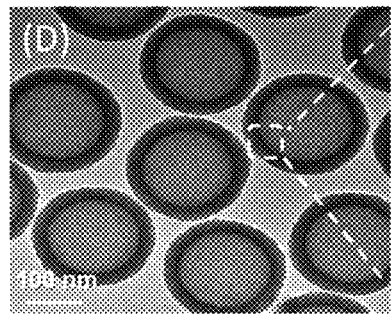 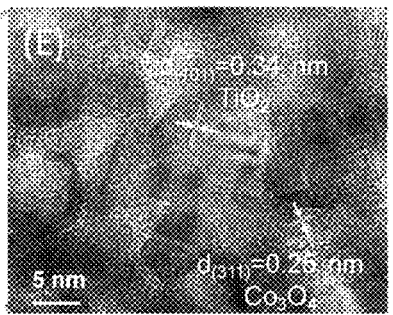 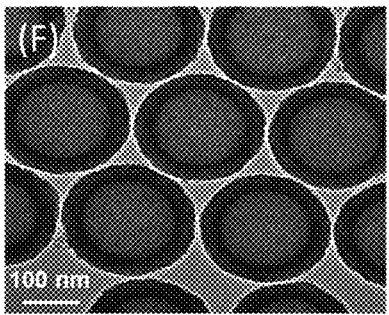
FIG. 4D　　　　　　　FIG. 4E　　　　　　　FIG. 4F

US 10,987,659 B1

SYNTHESIS OF TIO2/CO3O4 CORE-SHELL PHOTOCATALYSTS

FIELD OF THE INVENTION

The invention is generally related to methods of synthesizing $TiO_2/Co_3O_4$ core-shell photocatalysts using a combined template-based and sol-gel approach and catalytic methods thereof.

BACKGROUND OF THE INVENTION

Hole scavenger-assisted hydrogen generation via photocatalysis could be a promising route for clean energy production [1-4]. Numerous research projects are focused on $H_2$ generation through water splitting using photocatalysis because of its sustainability, and environmental benefits [3-9]. The water-splitting process takes place by the action of a semiconducting photocatalyst, in which the conduction band (CB) edge will have a negative redox potential for $H^+/H_2$ half-reaction (0.0 V vs. NHE) and the valence band (VB) edge will be more positive to the redox potential for $O_2/H_2O$ (1.23 V) half-reaction. $TiO_2$ has been proved to be a good contender for this type of $H_2$ generation process due to its stability, low cost, chemical corrosion resistance, and its non-toxic nature compared to various oxides [10-13]. However, yields of $H_2$ over $TiO_2$ are still low for industrial application due to various reasons such as i) the overpotential for $H_2$ evolution on the $TiO_2$, ii) rapid recombination of $H_2$ and $O_2$ to form $H_2O$, and iii) the fast recombination of the charge carriers in the reaction vessel [10,14].

To overcome these limitations, alternative approaches can be applied to increase the photocatalytic efficiency of the system. Some approaches include, application of p-n heterojunctions [15-17], doping the semiconductor with a cocatalyst [12,18-20], the addition of sacrificial components, [21] and the application of a Z-scheme combination [22, 23]. For example, metals have been attached to the $TiO_2$ exterior surface to promote $H_2$ generation yield by reducing recombination processes [10]. The presence of a metal nanoparticle, such as Pt, causes the photo-electrons to occupy a Fermi level (Ef) lower in value than that of the CB of $TiO_2$ subsequently enhancing the charge separation [24,25]. In general, noble metals are helpful because of their higher work function and efficient charge separation in enhancing the photoefficiency of the system [11,15,16,26]. Pt has been shown to be an extremely effective cocatalyst for $H_2$ generation upon doping on $TiO_2$ [27]. Transition metals have also been utilized as cost-effective cocatalysts for visible light response [28, 29]. A major aspect that enhances the photocatalytic ability of the photocatalyst is its specific surface area. High surface area photocatalysts provide adequate responsive spots for photocatalytic progression [30]. The mesoporous hollow-structured spheres represent a morphology that is efficient in light cultivation in the photocatalytic process [31-41].

The $Co_3O_4$—$TiO_2$ p-n heterojunction is typically used in photocatalytic water splitting purposes [42-44]. However, the generated hydrogen from these reported structures was comparatively lower than expected [43], this could be mainly due to the relatively low specific surface area (40~120 $m^2 g^{-1}$) [44-46]. Hollow-structured core-shell photocatalysts, that are usually synthesized via template-assisted methods exhibit higher surface area [47], lower bandgap [48], and controllable shell/core structure [49]. Additionally, cobalt oxide cocatalysts demonstrate an efficient hydrogen evolution compared to other metal-supports [42, 43, 50, 51].

New $Co_3O_4$—$TiO_2$ photocatalysts and methods for synthesizing the same are needed for improved hydrogen evolution reactions. In particular, synthesis methods that allow for simple scaling up of the preparation of such photocatalysts as compared to the complicated routes previously used, e.g. atomic layer deposition, are needed [45].

SUMMARY

Described herein are $TiO_2/Co_3O_4$ core-shell photocatalysts and methods for synthesizing the same which provide increased hydrogen production from water splitting reactions.

An aspect of the disclosure provides a method of synthesizing $TiO_2/Co_3O_4$ core-shell photocatalysts, comprising preparing $SiO_2$ hollow nanospheres via sol-gel synthesis in the presence of a nonionic surfactant and a cationic surfactant; adding titanium sec-butoxide to a solution containing the $SiO_2$ hollow nanospheres to provide a first combined sample; calcinating the first combined sample to provide hollow mesoporous $TiO_2$ nanospheres; adding cobalt nitrate to a solution comprising the hollow mesoporous $TiO_2$ nanospheres to provide a second combined sample; and calcinating the second combined sample to provide $TiO_2/Co_3O_4$ core-shell photocatalysts. In some embodiments, the nonionic surfactant is poloxamer 407. In some embodiments, the cationic surfactant is hexadecyltrimethylammonium bromide.

Another aspect of the disclosure provides a $TiO_2/Co_3O_4$ core-shell photocatalyst produced by a method as disclosed herein. In some embodiments, the concentration of $Co_3O_4$ in the photocatalyst is 2.5-3.5 wt %. In some embodiments, the photocatalyst has a surface area of at least 430 $m^2/g$.

Another aspect of the disclosure provides a method of producing hydrogen by water-splitting, comprising circulating water under visible light in the presence of a $TiO_2/Co_3O_4$ core-shell photocatalyst under conditions suitable for forming hydrogen, wherein platinum is photodeposited on the $TiO_2/Co_3O_4$ core-shell photocatalyst by photoreduction during hydrogen generation. In some embodiments, a source of the platinum is hexachloroplatinic acid which is added during the circulating step. In some embodiments, the concentration of platinum photodeposited onto the photocatalyst is 0.4-0.6 wt %. In some embodiments, the amount of photocatalyst included is 1.5-1.7 g/L. In some embodiments, the hydrogen evolution is at least 20000 µmol/g.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 4A-F. TEM images of pure $TiO_2$ hollow spheres (A) and x % $Co_3O_4$(shell)@$TiO_2$(core) nanocomposites at x=1.0(B), 2.0 (C), 3.0 (D) and 4.0 (F). The high-resolution TEM image of (D) showing lattice parameters for $Co_3O_4$ and $TiO_2$ represented in (E).

DETAILED DESCRIPTION

Figure 1:
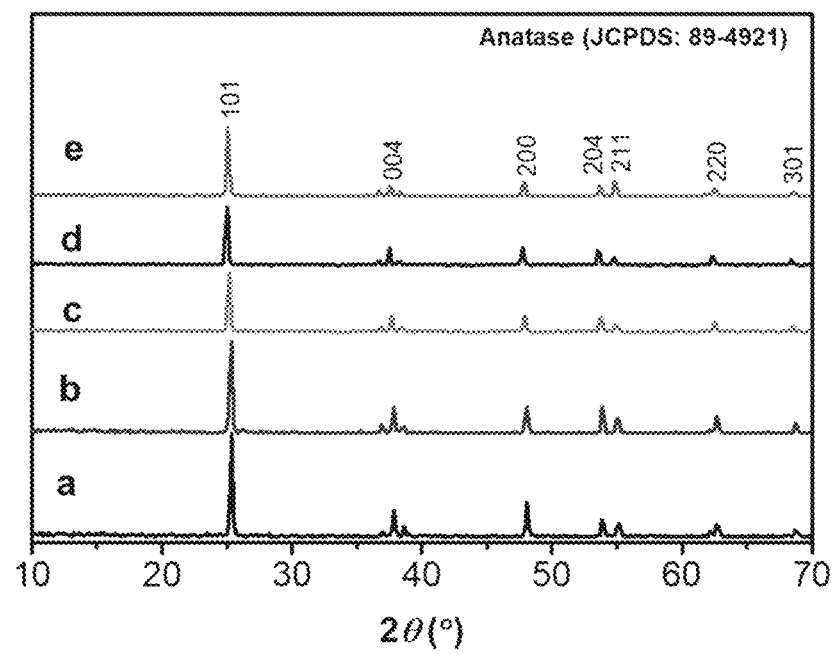
FIG. 1. X-ray diffraction patterns of samples at different wt % of Co source at 0, 1, 2, 3, and 4 as represented by a, b, c, d, and e, individually.

Embodiments of the disclosure provide synthesis methods that utilize a high surface area $SiO_2$ template to guide structuring of hollow $TiO_2$ nanospheres. The $SiO_2$ template is formed via a sol-gel synthesis method in the presence of a non-ionic surfactant and a cationic surfactant. The addition of a $Co_3O_4$ nanoshell provides a nanocomposite comprising p-n junction $Co_3O_4$@$TiO_2$ hollow sphere structures demonstrating significant bandgap tuning due to the controllable $Co_3O_4$ shell thickness as well as a high surface area that increase the possible number of photoactive sites available for oxidation-reduction reactions.

The p-n core-shell heterojunction photocatalysts comprising $Co_3O_4$(shell)@ $TiO_2$(core) hollow spheres that exhibit extraordinary surface area (e.g. at least 430 m²/g), visible light responsivity (e.g. bandgap of 2.6 eV), low consumption of nitrate salt, high replicability and recyclability. The photoactivity for hydrogen production is also the highest among prior materials (e.g. 22.4 mmol/g) in 9 h of visible light irradiation. The photocatalysts described herein can produce hydrogen under visible light irradiation without the assistance of UV or $H_2O_2$.

A hollow nanoparticle comprises a core particle and a cavity substantially defined by the core, wherein the core has a thickness greater than or equal to about 5 nm and the cavity has a curved surface. Hollow nanoparticles described herein, in some embodiments, have a cavity exhibiting various morphologies. In some embodiments, for example, the cavity is substantially spherical or hemispherical. In some embodiments, the cavity is substantially parabolic, elliptical, or ellipsoidal. In some embodiments, the cavity comprises a polygonal or faceted surface. The cavity, in some embodiments, exhibits various sizes. In some embodiments, the cavity has a diameter of about 50 nm to about 300 nm. In some embodiments, the cavity has a diameter of about 100-150 nm.

Hollow nanoparticles described herein, in some embodiments, exhibit various morphologies. In some embodiments, a hollow nanoparticle described herein is substantially hemispherical. In some embodiments, the nanoparticle comprises a curved exterior surface. In some embodiments, the nanoparticle is substantially spherical. In some embodiments, the nanoparticle comprises a parabolic exterior surface. In some embodiments, the nanoparticle is substantially elliptical or ellipsoidal.

Hollow nanoparticles described herein, in some embodiments, have various sizes. In some embodiments, a hollow nanoparticle comprising a core, a cavity substantially defined by the core, and a shell surrounding the core has a diameter of about 50 nm to about 1000 nm. In some embodiments, the hollow nanoparticle has a diameter of about 50 nm to about 160 nm, about 60 nm to about 160 nm, about 80 nm to about 160 nm, or about 100 nm to about 150 nm. In some embodiments, the shell has a thickness of about 2-20 nm.

The synthesis methods described herein comprise a step of preparing $SiO_2$ hollow nanospheres as a template via sol-gel synthesis in the presence of two different surfactants, e.g. a non-ionic surfactant and a cationic surfactant. The source of $SiO_2$ may be tetraethyl orthosilicate (TEOS) as a precursor. Sol-gel synthesis methods are known in the art. The process involves conversion of monomers into a colloidal solution (sol) that acts as the precursor for an integrated network (gel) of discrete particles. Several parameters of the method can be manipulated, making the method highly tunable, and enabling production of sols, gels, and particles with various desired characteristics. Variables that can be controlled and which control the product characteristics include the choice of metal salts, the metal salt concentration, and incubation temperature and time.

Suitable non-ionic surfactants include triblock copolymer surfactants such as poloxamers. Poloxamers are composed of a central hydrophobic chain of polyoxypropylene (poly (propylene oxide)) flanked by two hydrophilic chains of polyoxyethylene (poly(ethylene oxide)). Poloxamers are also known by the trade names Synperonic®, Pluronic® (e.g. Pluronic® p 123, Pluronic® p 127, and Pluronic® f68), and Kolliphor®. Because the lengths of the polymer blocks can be customized, many different poloxamers exist that have slightly different properties. For the generic term poloxamer, these copolymers are commonly named with the letter P (for poloxamer) followed by three digits: the first two digits multiplied by 100 give the approximate molecular mass of the polyoxypropylene core, and the last digit multiplied by 10 gives the percentage polyoxyethylene content (e.g. P407=poloxamer with a polyoxypropylene molecular mass of 4000 g/mol and a 70% polyoxyethylene content). In some embodiments, the non-ionic surfactant is poloxamer 407.

Suitable cationic surfactants include hexadecyltrimethylammonium bromide (also known as cetyltrimethylammonium bromide (CTAB)) and other aliphatic quaternary ammonium compounds. Other suitable surfactants include hexarimethylammonium bromide.

The $SiO_2$ hollow nanospheres are used as a template to produce hollow mesoporous $TiO_2$ nanospheres. The template method changes the morphology of products, mainly, by controlling the crystal nucleation and growth during nanomaterial preparation. Route of nanomaterial synthesis by using the template method is generally divided into three steps: First, the template is prepared as discussed herein. Second, a synthetic approach such as a hydrothermal method, precipitation, or sol-gel method is used to synthesize the target production under the function of template. Finally, the third step is the template removal, e.g. via calcination. In some embodiments, the titanium precursor is selected from titanium sec-butoxide, titanium isopropoxide, and titanium tetrachloride.

Figure 11:
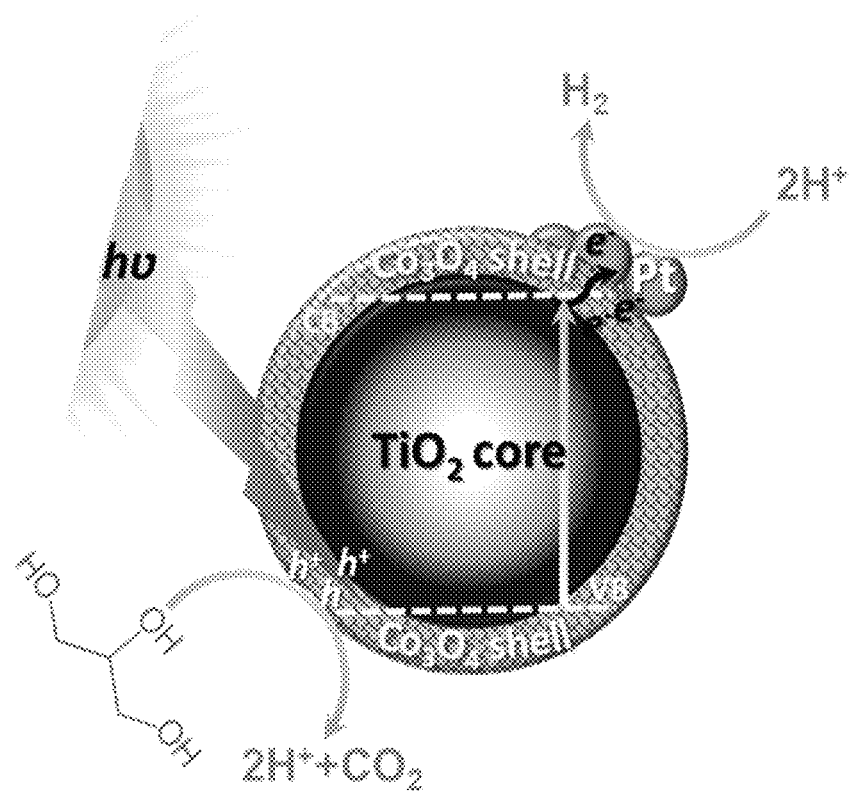
FIG. 11. Photocatalytic hydrogen production scheme by the 3% $Co_3O_4$@$TiO_2$ nanocomposite.

Once the hollow mesoporous $TiO_2$ nanosphere cores are produced, a $Co_3O_4$ nanoshell is added. In some embodiments, a cobalt precursor, e.g. cobalt nitrate, is added to a solution comprising the hollow mesoporous $TiO_2$ nanospheres and calcinated to provide $TiO_2/Co_3O_4$ core-shell photocatalysts (FIG. 11). Other suitable cobalt precursurs include cobalt chloride, cobalt isopropoxide, and cobalt salts.

Further embodiments of the disclosure provide a $TiO_2/Co_3O_4$ core-shell photocatalyst produced by a method as disclosed herein. In some embodiments, the concentration of $Co_3O_4$ in the photocatalyst is 2.5-3.5 wt %, e.g. about 3 wt %. In some embodiments, the photocatalyst has a surface area of at least about 400 $m^2/g$, e.g. at least about 405, 410, 415, 420, 425, or 430 $m^2/g$.

In some embodiments, the photocatalyst described herein does not include $C_3N_4$ (carbon nitride).

Additional embodiments of the disclosure provides a method of producing hydrogen by water-splitting using a photocatalyst as described herein. Photocatalytic water splitting is an artificial photosynthesis process with photocatalysis in a photoelectrochemical cell used for the dissociation of water into its constituent parts, hydrogen ($H_2$) and oxygen ($O_2$), using either artificial or natural light. The methods of the disclosure comprise a step of circulating water under visible light in the presence of a $TiO_2/Co_3O_4$ core-shell photocatalyst under conditions suitable for forming hydrogen. In some embodiments, platinum is photodeposited on the $TiO_2/Co_3O_4$ core-shell photocatalyst by photoreduction during hydrogen generation. The metallic Pt plays the role of transferring the excited electrons. In some embodiments, a source of the platinum is hexachloroplatinic acid which is added during the circulating step. In some embodiments, the concentration of platinum photodeposited onto the photocatalyst is 0.4-0.6 wt %, e.g. about 0.5%. In some embodiments, the hydrogen evolution is at least 20000 μmol/g, e.g. at least 22400 μmol/g.

The amount of catalyst added to the reaction is a catalytically effective amount. As used herein, the term "catalytically effective amount" refers to an amount of catalyst that provides a measurable conversion of reactants to products. The exact concentrations employed, of course, will depend on, among other factors, the desired catalytic properties. Examples of catalytic properties include, inter alia, operability (resistance to runaway), selectivity, activity, conversion, stability and yield. It is understood by one skilled in the art that one or more of the individual catalytic properties may be enhanced by the "promoting amount" while other catalytic properties may or may not be enhanced or may even be diminished. It is further understood that different catalytic properties may be enhanced at different operating conditions. For example, a catalyst having enhanced selectivity at one set of operating conditions may be operated at a different set of conditions wherein the improvement shows up in the activity rather than the selectivity. It may be desirable to intentionally change the operating conditions to take advantage of certain catalytic properties even at the expense of other catalytic properties. The exact operating conditions will depend upon, among other factors, feedstock costs, energy costs, by-product removal costs and the like.

In some embodiments, the amount of photocatalyst included is 1.5-1.7 g/L, e.g. about 1.6 g/L.

The conditions for carrying out a water-splitting reaction in the presence of the catalyst of the present disclosure broadly comprise those described in the prior art. This applies, for example, to suitable temperatures, pressures, residence times, diluent materials, the presence or absence of moderating agents to control the catalytic action, the desirability of employing recycle operations or applying successive conversion in different reactors to increase the yields of hydrogen, and any other special conditions which may be selected in processes for producing hydrogen.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Summary

This Example provides an operative method to infuse $Co_3O_4$ to a hollow-structured $TiO_2$ sphere. In this work, we synthesized hollow mesostructured $TiO_2$ nanospheres decorated with $Co_3O_4$ nanoshells through template-based and sol-gel approaches. The produced photocatalysts are p-n heterojunction $Co_3O_4(shell)@TiO_2(core)$ hollow spheres with a great specific surface area. This mesostructure provides a vast number of photoactive sites for the photocatalytic response. Hexachloroplatinic acid was employed during the photocatalytic action to yield 0.5% $Pt/Co_3O_4(shell)$ $@TiO_2(core)$ composites. The metallic Pt plays the role of transferring the excited electrons. The nanojunction between the p-$Co_3O_4$ and n-$TiO_2$ can proficiently prohibit the recombination of photocharges. Consequently, resulting in an outstanding photocatalytic hydrogen production under visible light.

Materials and Methods

Chemicals: $Ti(OC(CH_3)_3)_4$, cobalt nitrate hexahydrate, Ammonia solution, $C_2H_5OH$, HCl, $CH_3COOH$, hexadecyltrimethylammonium bromide (HTAB), and poloxamer 407 were obtained from Sigma-Aldrich.

Preparation of $SiO_2$ hollow nanospheres: The $SiO_2$ hollow nanosphere was formed using the sol-gel technique in the presence of poloxamer 407 and hexadecyltrimethylammonium bromide (HTAB) as surfactants according to the following steps: 20 mL of deionized water, 40 mL ethanol, 1.5 g hexadecyltrimethylammonium bromide, 4.5 g of poloxamer 407, 2.35 mL of acetic acid and 0.75 mL of HCl were mixed and the resulting mixture was stirred at 27° C. for 60 min. The 0.4 mL of TEOS was then added to the solution and the obtained mixture was stirred for 60 min. The ethanol was evaporated at 40° C. for 24 h and the $SiO_2$ hollow nanospheres were collected.

Preparation of Hollow mesoporous $TiO_2$ nanosphere: 0.5 g of as-formed $SiO_2$ nanospheres was dissolved in 40 mL of ethyl alcohol, then added to a 0.4 mL ammonia solution and 0.4 mL hexadecyltrimethylammonium bromide with stirring for 15 min. 0.4 mL of titanium sec-butoxide was then added and the resulting mixture was left at room temperature for 30 min. To produce the hollow mesoporous $TiO_2$ nanospheres, the $SiO_2@TiO_2$/HTAB sample was dehydrated in the air at 40° C. for 24 h and then calcinated for 4 h at 500° C. using 1° C./min heating rate.

Preparation of $Co_3O_4(shell)@TiO_2(core)$ hollow mesoporous nanospheres: Hollow mesoporous nanosphere $Co_3O_4@TiO_2$ nanocomposites were prepared as in the following steps: 0.5 g of hollow mesoporous $TiO_2$ nanosphere was dispersed in 40 mL deionized water and 10 mL of acetic acid. Then, 0.01 g of cobalt nitrate was added and the obtained mixture was left at room temperature for 60 min. The hollow mesoporous nanospheres $Co_3O_4@TiO_2$ were finally produced by dehydrating the mixture at 40° C. for 24 h and then calcination in the air for 4 h at 400° C. using 1° C./min heating rate. This method with repeated three times to prepare different weight percent of x % $Co_3O_4$ to $TiO_2$ where x=0, 1, 2, 3, and 4 wt %.

Characterization: The structure morphology for hollow nanospheres of $TiO_2$ and $TiO_2/Co_3O_4$ nanocomposites was studied using JEOL-JEM-1230 transmission electron microscope (TEM) and a JEOL-JSM-5410 scanning electron microscope (SEM). The crystalline structure of x % $Co_3O_4@TiO_2$ nanocomposites obtained by Bruker axis D8 X-ray diffractometer utilizing Cu Kα radiation ($\lambda$=1.540 Å). The $N_2$ adsorption/desorption isotherms of the hollow nanospheres and nanocomposites were observed at 77 K by a Chromatech apparatus (Nova 2000 series) after degassing at 150° C. The elemental analysis investigated through the core-level X-ray photoelectron spectra (XPS) measurements via K-ALPHA spectrometer (Thermo Scientific). The diffusive reflectance (DRS) of the obtained materials chronicled at room temperature by JASCO a V-570 spectrophotometer. The $E_g$ was determined from the DRS by Tauc formula. The photocharge recombination studies were investigated through photoluminescence (PL) spectra of gained structures via RF-5301 fluorescence spectrophotometer (Shimadzu). The vibrational spectra of the obtained samples were studied via a Perkin-Elmer spectrophotometer at a resolve of 4.0 wavenumber FTIR spectrometer in the range 4000-400 $cm^{-1}$ Raman depiction was done by Horiba Lab RAM instrument applying 523.5 nm from Ar ion laser. Finally, Zahner Zennium electrochemical workstation was cast to measure the photocurrent intensity and to measure transient photocurrent.

Photocatalytic $H_2$ generation: The photoactivity of the $Co_3O_4(shell)@TiO_2(core)$ nanospheres for $H_2$ generation was examined in a 250 mL photocell having a water circulator system. A 500 W Xe light source with a cutoff filter (<420 nm) was immobile in a horizontal manner on the photocell. A pre-calculated dose of the obtained photocatalyst was dispersed in 10 vol % of glucose solution. The metallic Pt was photodeposited on the $Co_3O_4@TiO_2$ nanospheres by photoreduction during the photoreaction of $H_2$ generation. Typically, 26 µL of 50 mM of hexachloroplatinic acid was added into the photocell. Before the photoreaction, Ar gas was bubbled for 15 min to eradicate oxygen. The illumination period for the photoreaction was 9 hours. The $H_2$ progression was followed by the Agilent GC 7890A gas chromatograph.

Results and Discussion

The XRD diffractograms of the obtained samples with various contents of $Co_3O_4$ are described in FIG. 1. The produced $TiO_2$ and x % $Co_3O_4@TiO_2$ nanocomposites were mainly of the anatase phase. The characteristic diffraction positions at (2Θ)=25.2°, 37.8°, 48.0°, 53.7°, 54.9°, and 62.2° are in typical coincidence with the (hkl) index planes represented in FIG. 1. It should be noticed that the main (101) intensity was reduced by incorporating the 1~4 wt. % of the Co source. There was no indication of any other impurity phases in all samples.

Figure 2:
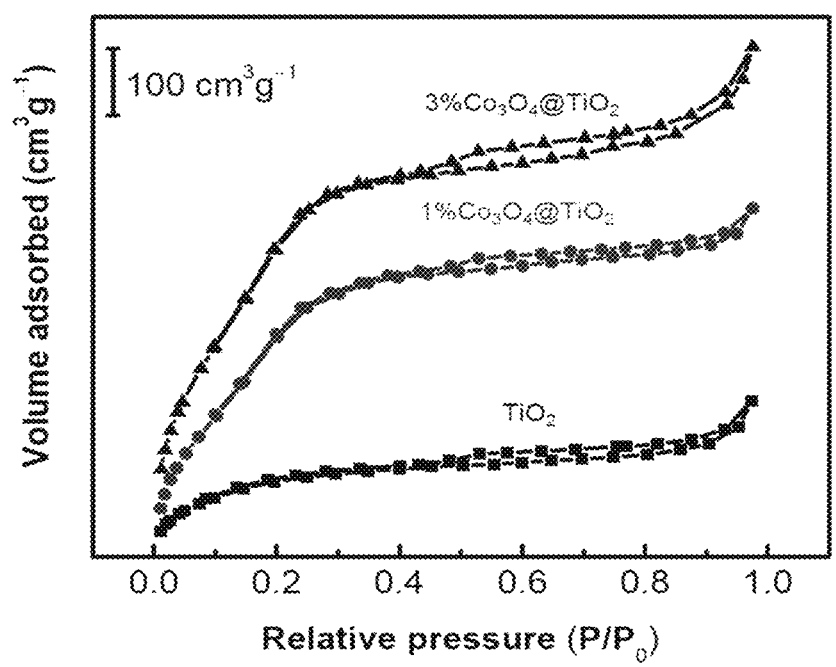
FIG. 2. Nitrogen adsorption/desorption isotherms of selected hollow-structured $TiO_2$ compared to 1.0 and 3.0 wt. % $Co_3O_4$@$TiO_2$ nanocomposites.
Figure 3A:
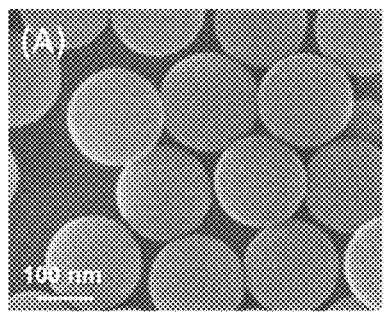
FIGS. 3A-F. SEM images of pure $SiO_2$ hollow spheres (A) and x % $Co_3O_4$@$TiO_2$ nanocomposites at x=0.0 (B), 1.0 (C), 2.0 (D), 3.0 (E), and 4.0 (F).
Figure 3B:
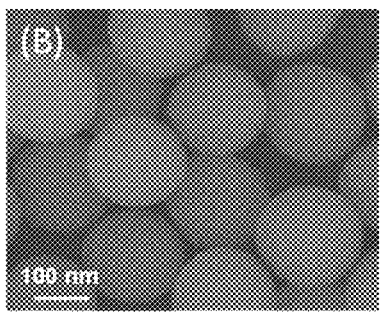
Figure 3C:
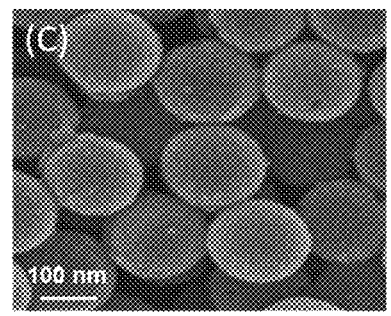
Figure 3D:
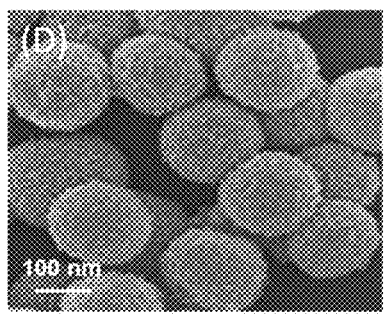
Figure 3E:
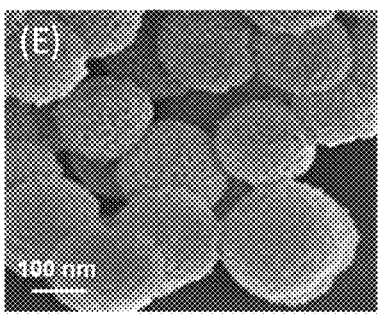
Figure 3F:
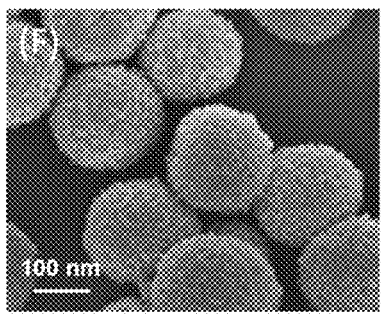

FIG. 2 displays the $N_2$ adsorption/desorption isotherms of the hollow-structured $TiO_2$ with 1 and 3 wt. % $Co_3O_4$ as indicated. The isotherms unveiled the characteristic $H_3$ hysteresis type IV loop, [53]. This feature suggests a mesoporous structured composite [54, 55]. The specific surface texture in terms of surface area and volumetric measure of pure $TiO_2$ are 401 $m^2\ g^{-1}$ and 0.490 $m^3\ g^{-1}$, correspondingly. The surface texture parameters are progressively augmented by the addition of $Co_3O_4$-coated the hollow nanosphere (Table 1).

The 4 wt. % $Co_3O_4/TiO_2$ nanocomposite displayed a 430 $m^2\ g^{-1}$ of surface area and 0.580 $m^3\ g^{-1}$ for the pore volume [52, 56]. The surface characteristics of all the synthesized nanocomposites with varying $Co_3O_4$ are presented abridged in Table 1. The characteristic structural surface of the $Co_3O_4@TiO_2$ nanocomposites is predicted to indorse the $H_2$ evolution.

The morphological structures of the produced samples are depicted through the SEM and TEM images as presented in FIG. 3 and FIG. 4, respectively. The $SiO_2$ template is seen in FIG. 3A with a diameter of about 120 nm showing a flat spherical exterior. While the produced $TiO_2$ spheres are also extant a flat superficial with little increase of size (130 nm) as seen in both FIGS. 3B and 4A. The hollow-mesoporous $TiO_2$ spheres with a bumpy shallow seen with a similar diameter pure $TiO_2$ (FIG. 3C, FIG. 4B) upon loading with 1% of Co. The presence of rough nanoparticles is referred to as the small loading of the $Co_3O_4$. As presented the $Co_3O_4$ nano-shell with ~20 nm is composed of small nanoparticles. FIGS. 3D~F and FIGS. 4 C~F are showing that the surface of the hollow-structured $TiO_2$ spheres having a rough decoration of $Co_3O_4$ nanoshells. FIG. 4E displays the lattice parameter of the shell and the core at 0.25 and 0.34 nm, which is credited to the (311) plane of $Co_3O_4$ and the (101) plane of anatase $TiO_2$ [29,57]. The thin-layered structure of $Co_3O_4$ is composed of small flake-like particles covering the $TiO_2$ hollow spheres. This designated structure can offer super active sites for photocharge conduction upon light illumination. Furthermore, the $Co_3O_4$ (shell) @ $TiO_2$(core) exhibits a close heterojunction interface indicating an improved subsequent photoactivity.

The elemental and chemical composition of the prepared photocatalyst was revealed through XPS analysis of the selected 3% $Co_3O_4$@$TiO_2$ sample as displayed in FIG. 5.

Table 1. Effect of $Co_3O_4$ nanoshell addition on the physicochemical characteristics of synthesized $TiO_2$ hollow spheres.

| Sample | $S_{BET}$ ($m^2$/g) | Pore volume ($cm^{-3}g^{-1}$) | Abs. edge (nm) | $E_g$ (eV) | PL peaks (nm) | Generated $H_2$ (µmol $g^{-1}$) |
|---|---|---|---|---|---|---|
| $TiO_2$ | 400.0 | 0.488 | 392 | 3.43 | 388 | 10 |
| 1% $Co_3O_4$@$TiO_2$ | 410.0 | 0.520 | 409 | 3.05 | 416 | 4200 |
| 2% $Co_3O_4$@$TiO_2$ | 420.0 | 0.540 | 447 | 2.94 | 478 | 14000 |
| 3% $Co_3O_4$@$TiO_2$ | 425.0 | 0.570 | 506 | 2.6 | 557 | 18200 |
| 4% $Co_3O_4$@$TiO_2$ | 430.0 | 0.580 | 507 | 2.57 | 557 | 18240 |

Figure 5A:
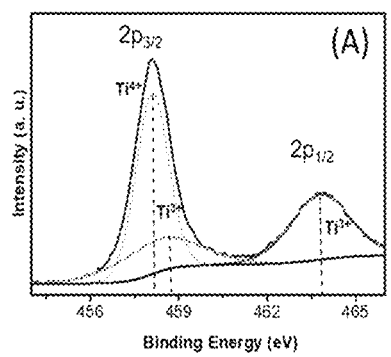
FIGS. 5A-C. High-resolution XPS of 3.0$Co_3O_4$@$TiO_2$ nanocomposite showing Ti2p (A), $Co_2$p (B), and O1S (C).
Figure 5B:
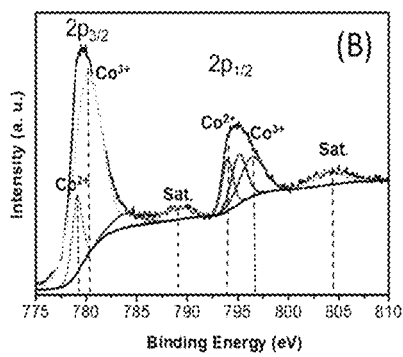
Figure 5C:
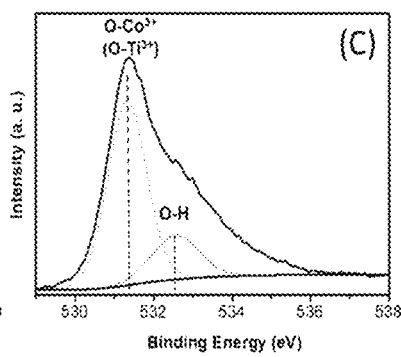

The Ti 2p band exposed in FIG. 5A discloses two core peaks at 458.2 and 464.1 eV for the chemical states of $Ti^{3+}$ and $Ti^{4+}$ [57]. The Co2p XPS core level (FIG. 5B) shows two doublets at 796.5 eV ($2p_{1/2}$)-780.2 eV ($2p_{3/2}$) and 789.0 eV($2p_{1/2}$)-803.6 eV($2p_{3/2}$) assigned to $Co^{3+}$ and $Co^{2+}$ states, individually. The cohabitation of the $Co^{2+}$ and $Co^{3+}$ species is also confirmed from the spin-orbit splitting of 14.6 eV and the satellite peaks around 790 and 805 eV [58]. The co-occurrence of $Co^{3+}$ and $Co^{2+}$ agrees with the existence of $Co_3O_4$ on the exterior of the $TiO_2$/$Co_3O_4$-3 wt % nanocomposites. As well, the 0 is band in FIG. 5C shows one peak at 531.4 eV, which is deconvoluted to the oxide-structured $TiO_2$ or $Co_3O_4$ (531.4 eV), and the $^-$OH assemblies adsorbed onto the sample's surface (532.6 eV) [57,58].

Figure 6A:
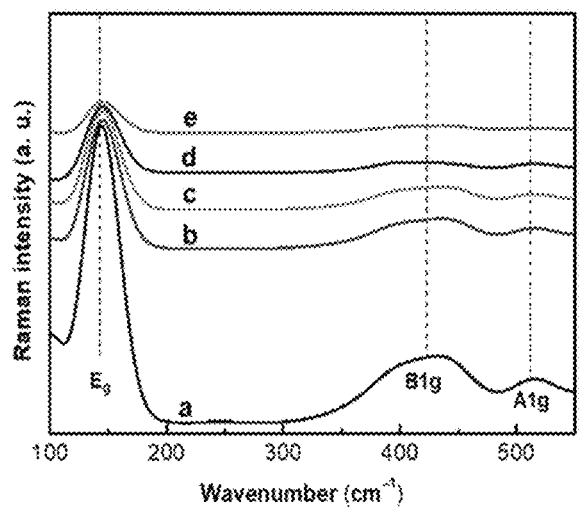
FIGS. 6A-B. Raman (A) and FTIR (B) spectra investigation of samples of various wt. % of Co source at 0, 1, 2, 3, and 4% as signified by a, b, c, d, and e, correspondingly.

Supplementary investigation for the structure of the x % $Co_3O_4$@$TiO_2$ was attained by Raman spectroscopy as in FIG. 6A. The Raman spectra present discrete bands situated at 145, 420, and 516 $cm^{-1}$, which signify the vibrant Eg, B1g, and A1g modes of the anatase phase [59]. The addition of the $Co_3O_4$ shell into the $TiO_2$ did not alter the Raman spectra except for the intensity of the vibrational modes. The Raman bands of $Co_3O_4$ lies in the same range of the anatase one as 146 $cm^{-1}$ ascribed to Co lattice vibrations are overlain with the $TiO_2$. The observed Raman bands for the $Co_3O_4$ at 147, 387, and 515 $cm^{-1}$ for tetrahedral F2g symmetry of $CoO_4$ according to the literature [60].

Figure 6B:
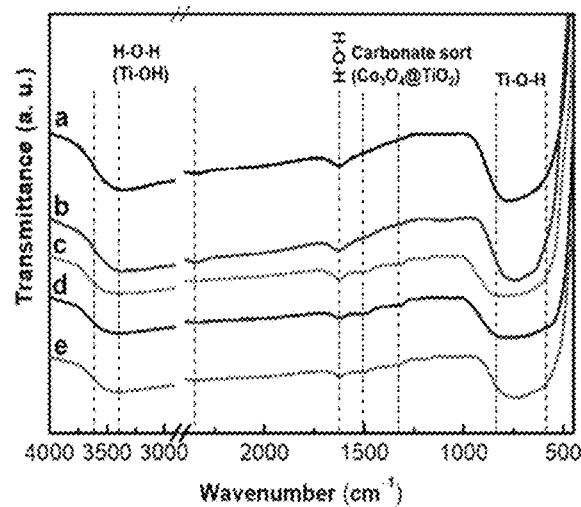
Figure 7A:
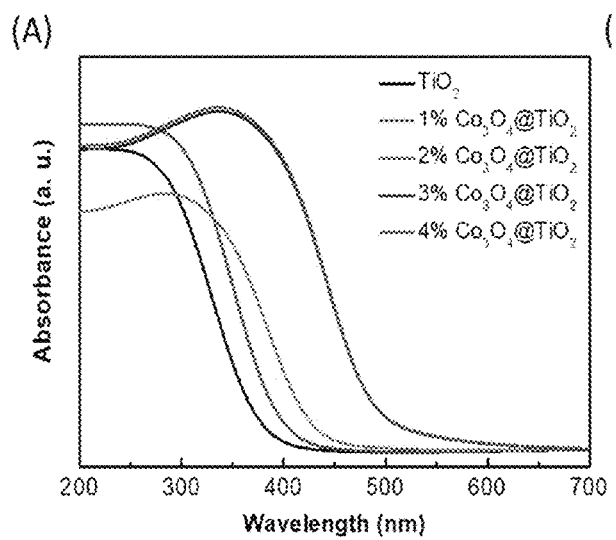
FIGS. 7A-B. UV-vis DRS of hollow-structured $TiO_2$ spheres compared to $Co_3O_4$@$TiO_2$ nanocomposites as designated in (A). The assessed bandgap using the Tauc plot in (B).
Figure 7B:
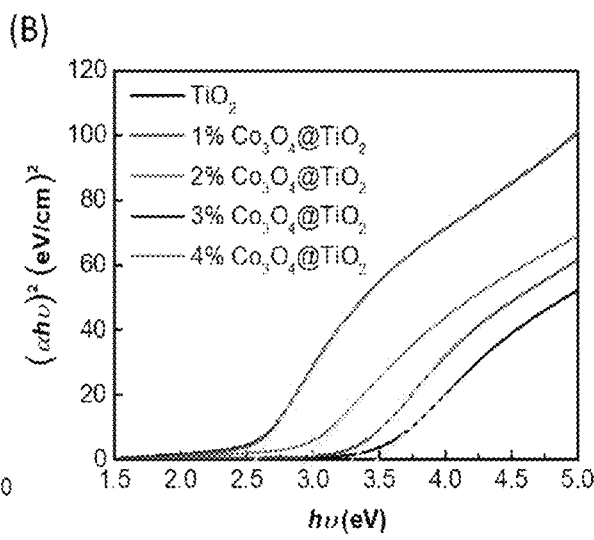

The functional groups within x % $Co_3O_4$@$TiO_2$ hollow spheres were analyzed via FTIR spectroscopy as in FIG. 6B. The spectra display discrete bands at 3565, 3385, 2340, 1627, 1498, 1341, 775, and 610 $cm^{-1}$ which are all indicating the typical spectra of functionalized $TiO_2$ [51]. The band located at 1627 $cm^{-1}$ the broader centered at 3385 $cm^{-1}$ are linked to chemisorbed or physisorbed water molecules [61]. Also, the wide band located at 3565 $cm^{-1}$ could be ascribed to the —OH group. The 2340 $cm^{-1}$ vibration belongs to the physical attachment of $CO_2$. The lower intensity features around at 1341 and 1498 $cm^{-1}$ may be ascribed to superficial carbonate type designed by the presence of $Co_3O_4$@$TiO_2$ in ambiance [60,62,63]. Lastly, the extensive band at 610~775 $cm^{-1}$ is situated within the Ti—O—H bending mode [63]. FIG. 7A shows the UV-vis DRS of the x % $Co_3O_4$@$TiO_2$ nanocomposites compared to the bare mesoporous $TiO_2$ hollow spheres. The bare $TiO_2$ exhibited a sizable enhancement of efficiency in light-harvesting by the introduction of $Co_3O_4$ nanoshells. The optical density in the visible range is enhanced as well. Thus, the close contact between the p-type $Co_3O_4$ and n-type $TiO_2$ amended the interfacial band edges resulting in the acceleration of photocharg production [64]. The estimated $E_g$ value of mesoporous $TiO_2$ is 3.43 eV, in contrast, the $Co_3O_4$@$TiO_2$ nanocomposites provide a wider light absorption capability due to its narrower $E_g$ of ~2.57 eV (Table 1, FIG. 7B). The decrease in the band gap values and the increase in the visible absorption values for the $Co_3O_4$@$TiO_2$ nanocomposites might be explained by the effects of nanoscale surface plasmon resonance [65,66] or the charge transfer in optical transitions between the $TiO_2$ core and the $Co_3O_4$ shell.

Figure 8A:
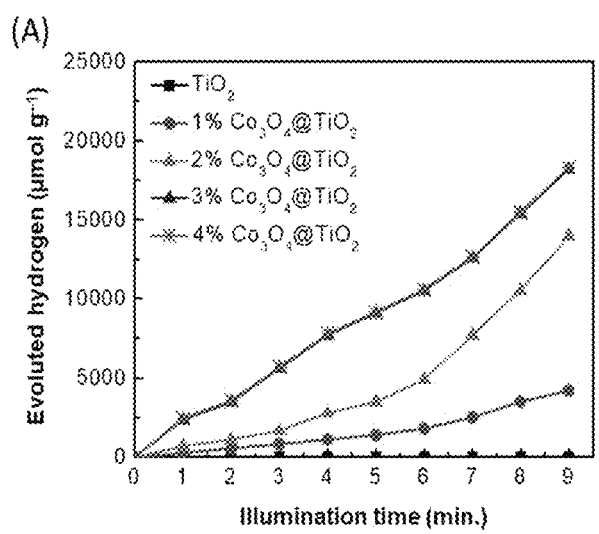
FIGS. 8A-B. Photocatalytic hydrogen progress against illumination time by applying diverse $Co_3O_4$-loaded $TiO_2$ core-shell structures as indicated in (A). The impact of the photocatalyst amount of the best 3% $Co_3O_4$@$TiO_2$ photocatalyst is presented in (B).
Figure 8B:
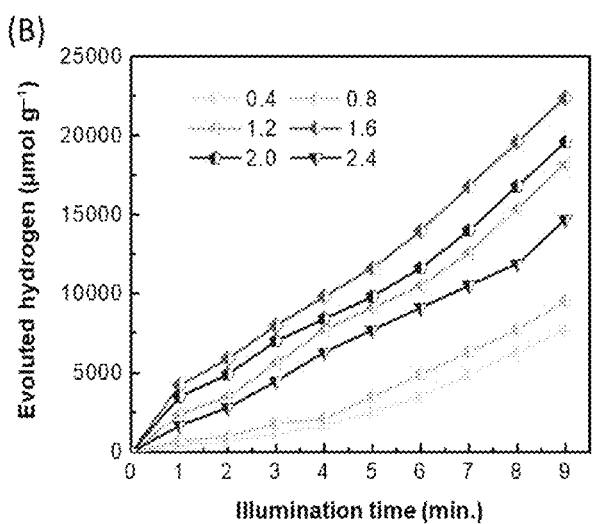
Figure 9:
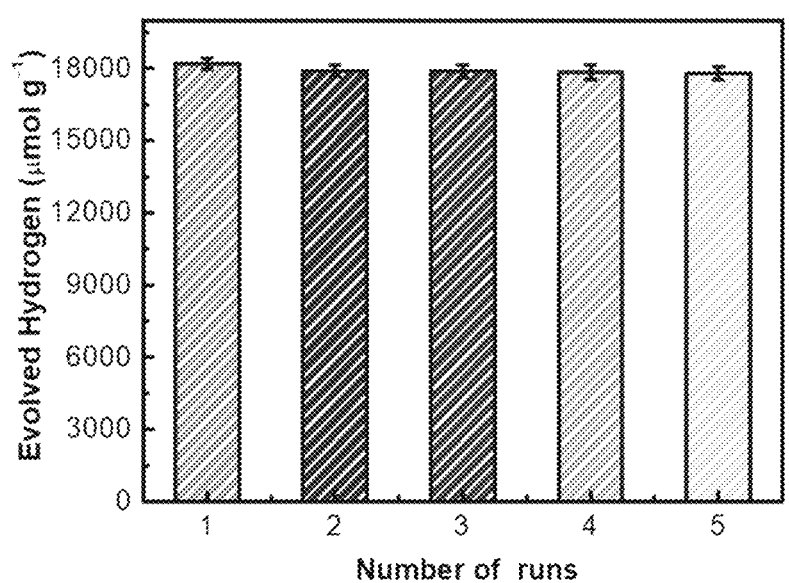
FIG. 9. The constancy of the improved dose of 3% $Co_3O_4$@$TiO_2$ hollow core-shell-structured photocatalyst with maintainable hydrogen production level after five consecutive cycles.

Photocatalytic $H_2$ evolution: The p-n heterojunction is fabricated by the amalgamation between a p-type $Co_3O_4$ nanoshell and n-type $TiO_2$ core fashions an electric field with band orientation. This core-shell nanocomposite hollow spheres powerfully ease the separation of photocharges and increases the photoefficiency [34,63,64]. The photocatalytic action of hollow-structured $TiO_2$ spheres and x % $Co_3O_4$@$TiO_2$ nanocomposites was utilized for $H_2$ generation under the illumination of visible light using glucose (10 vol % in $H_2O$) as a hole scavenger. The photosystem contains the $H_2PtCl_6$ deposits Pt nanoparticles on the surface of $Co_3O_4$@$TiO_2$. As seen in FIG. 8A, if $TiO_2$ was only used as a sole photocatalyst, trivial $H_2$ generation was observed (~10 µmol/g, Table 1). The poor photocatalytic $H_2$ generation utilizing only $TiO_2$ is due to the accelerated photocharge recombination and the large overpotential for $H_2$ generation. The x % $Co_3O_4$@$TiO_2$ heterojunction showed enhanced photoefficiency toward hydrogen evolution (FIG. 8A, Table 1). The mesoporous $Co_3O_4$@$TiO_2$ nanocomposites produced cumulative amounts of $H_2$ in an exponential trend through the photocatalytic reaction due to the higher photoactivity under visible light. The $H_2$ generation reached 18200 µmol/g after 9 h of light radiation by adding the $Co_3O_4$ nanoshell up to 3 wt %. The total $H_2$ was 1820 times superior to the bare $TiO_2$. The presence of $Co_3O_4$ leads to the formation of a suitable valance and conduction band positions for $H_2$ formation reaction. FIG. 8B illustrates the impact of 3% $Co_3O_4$@$TiO_2$ concentration from 0.4~2.4 g/L on the photogeneration of $H_2$ within the 9 h irradiation period. At the lowest dose of 0.4 g/L of 3% $Co_3O_4$@$TiO_2$ nanocomposite, the photogenerated $H_2$ evolution was ~7700 µmol/g. By increasing the dose to 1.6 g/L, the photogenerated $H_2$ enhanced to 22400 µmol/g compared to 9250 and 18200 µmol/g for 0.8 and 1.2 g/L, respectively. The further increase of the optimized photocatalyst to 2.4 g/L reduced the amount of generated $H_2$ to 14700 µmol/g. Thus, the optimal dose of the 3% $Co_3O_4$@$TiO_2$ nanocomposite was fixed at 1.6 g/L. The possible reasons for dropping the $H_2$ photogeneration could be the lessening of photoactive sites or the inefficient photon scattering due to the opacity of 3% $Co_3O_4$@$TiO_2$ that inhibit light photons [3,15,26]. The existence of the mesostructured hollow 3% $Co_3O_4$@$TiO_2$ heterojunctions enhances light collecting and reflection, the diffusion of glucose molecules scavenge the holes, and the high surface area of the material result in the observed superior photocatalytic efficiency. The reusability of the spent Pt/3% $Co_3O_4$@$TiO_2$ photocatalyst was investigated in FIG. 9. The generation of $H_2$ evolution over the reused photocatalyst was slightly decreased keeping the ~98% of the original $H_2$ amount after the fifth cycle.

Figure 10A:
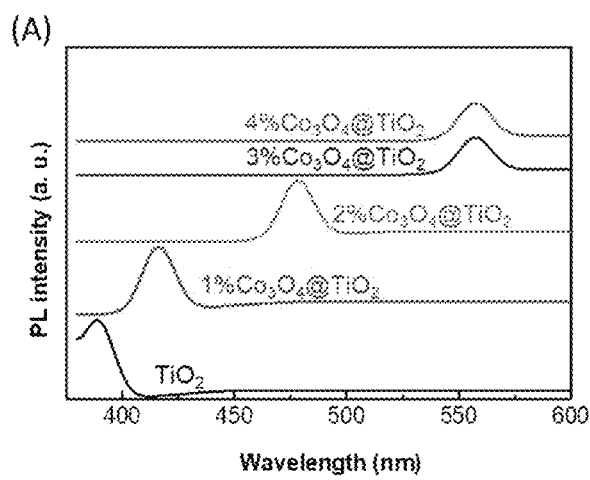
FIGS. 10A-B. PL spectra (A) and transient photocurrent intensity (B) of pure $TiO_2$ hollow spheres compared to x % $Co_3O_4$@$TiO_2$.
Figure 10B:
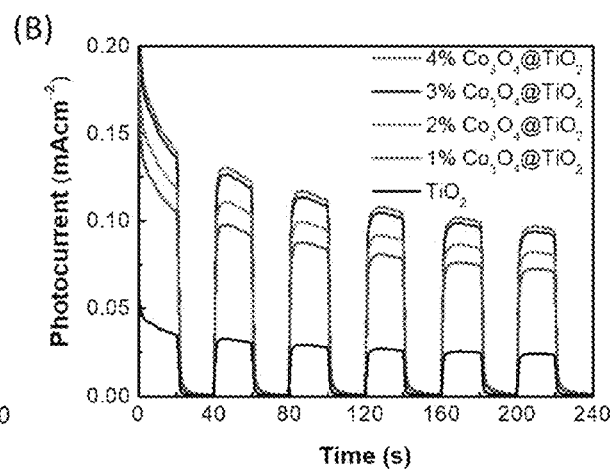

To understand why the 3% $Co_3O_4$@$TiO_2$ is the optimal photocatalyst, we investigated the PL spectra of x % $Co_3O_4$@$TiO_2$ compared to the pure $TiO_2$ hollow spheres as in FIG. 10A. The pure $TiO_2$ displayed a PL feature around 388 nm with relatively higher power than other samples. Nevertheless, the PL features of x % $Co_3O_4$@$TiO_2$ nanocomposites unveiled a redshift to the wavelength of 557 nm for the 3% $Co_3O_4$@$TiO_2$ with the lowest intensity (table 1). The reduction in the PL signal in this sample indicates the movement of electrons from the CB of $TiO_2$ to the CB of $Co_3O_4$ [66]. The lower signal of the 3% $Co_3O_4$@$TiO_2$ nanocomposite is due to the recombination suppression of the photocharges upon irradiation. Afterward, the electrons easily move to bend the Fermi level to less value. This results in a higher reductive ability of 3% $Co_3O_4$@ $TiO_2$. Concurrently, the modified trapped states imply an efficient electron-hole separation that subsequently enhances the evolution of $H_2$ [57, 66]. These outcomes were further confirmed by measuring the photocurrent intensity during light irradiation, as shown in FIG. 10B. According to the photocurrent results, the photocurrents for x % $Co_3O_4$@$TiO_2$ were increased by increasing the $Co_3O_4$ nanoshells compared to a negligible photoresponse by only $TiO_2$. The intense photocurrent indicates that 3% $Co_3O_4$@$TiO_2$ possess the highest ability to transfer the photogenerated carriers upon illumination [67].

The proposed mechanism regarding the photocatalytic generation of $H_2$ utilizing Pt/3% $Co_3O_4$@$TiO_2$ is presented in FIG. 11. The $Co_3O_4$-coated $TiO_2$ hollow sphere's surface works to reduce the recombination of the charge carriers by advancing the holes from $TiO_2$ to $Co_3O_4$ and electrons to the photodeposited Pt. The holes at the $Co_3O_4$ are captured by the glucose scavenger to produce protons. The electrons on the Pt surface can then oxidize the protons to produce $H_2$ on Pt particles [11,26,66]. The substantial narrowing of the $E_g$ of the 3% $Co_3O_4$@$TiO_2$ heterostructures was a reason for the favorable response to light illumination. Furthermore, the modified energy levels due to the close connection of the core-shell structure functionalize the hole-trapping spots that balance the potential of $H^+/H_2$ reaction. This eventually moves the electrons to the Pt nanoparticle which meets the glucose dispersed through the pores of the $Co_3O_4$@$TiO_2$ heterojunction. the glucose itself, like a scavenging agent, eats the holes. Thus, the placid electrons by Pt are transported to $H^+$ to form $H_2$ (FIG. 11). The photoproduction of $H_2$ in this way is being considerably augmented due to the synergy between the Pt and the constructed $Co_3O_4$(shells)@$TiO_2$(cores) photocatalyst.

Conclusion

We have effectively synthesized a novel hollow-structured $Co_3O_4$(shell)/$TiO_2$(core) photocatalysts by a template-based and sol-gel approaches with templates used for the first time. The 3% $Co_3O_4$-coated $TiO_2$ sample demonstrated the highest photoactivity for hydrogen generation under visible light irradiation compared to the parent bare $TiO_2$ hollow spheres. The $H_2$ production rate was determined to be 10 µmol h$^{-1}$ g$^{-1}$ over the pure hollow $TiO_2$, and it was as high as 1820 times more when 3% $Co_3O_4$-coated $TiO_2$ nanocomposite was used. The optimal $Co_3O_4$ shell content decorated on $TiO_2$ was 3%. The $H_2$ generation was significantly enhanced by the synergistic effects between Pt and $Co_3O_4$ on $TiO_2$ hollow spheres. The presence of hollow-structured $Co_3O_4$(shell)/$TiO_2$(core) photocatalysts potentially enhanced light-harvesting, scattering, and reflection, making the synthesized hollow-structured $Co_3O_4$(shell)/$TiO_2$(core) nanocomposites more effective harvesters of photons. The increased diffusion of glucose molecules due to the higher surface area resulted also in increased efficiency of a greater number of active sites. The excellent photocatalytic performance was due to the hollow structure, the high specific surface area, and the heterostructure between $TiO_2$ and $Co_3O_4$. A reasonable mechanism for the improved photocatalytic efficiency was proposed by facilitating the efficiency of charge carrier transfer at $TiO_2$/$Co_3O_4$ interface. This work offers prospective toward the fabrication of high efficient hollow mesoporous photocatalysts for hydrogen production. The procedure used to synthesize the $TiO_2$/$Co_3O_4$ nanocomposites is sufficient to create mesoporous mixed oxide photocatalysts for catalysis applications for clean energy applications.

REFERENCES

[1] A. Fujishima and K. Honda, Electrochemical photolysis of water at a semiconductor electrode, Nature, 238 (1972) 37-38.

[2] K. Maeda and K. Domen, Photocatalytic water splitting: recent progress and future challenges, J. Phys. Chem. Lett., 1(2010) 2655-2661.

[3] M. W. Kadi, R. M. Mohamed, A. A Ismail, D. W. Bahnemann, Decoration of mesoporous graphite-like $C_3N_4$ nanosheets by NiS nanoparticles driven visible light for hydrogen evolution, Applied Nanoscience, 8 (2018) 1587-1596.

[4] A. A. Ismail and D. W. Bahnemann, Photochemical splitting of water for hydrogen production by molecular photocatalysis: A Review, Solar Energy Materials & Solar Cells, 128 (2014)85-101.

[5] H. Tang, C. M. Hessel, J. Wang, N. Yang, R. Yu, H. Zhao and D. Wang, Two-dimensional carbon leading to new photoconversion processes, Chem. Soc. Rev., 43(2014) 4281-4299.

[6] J. Qi, K. Zhao, G. Li, Y. Gao, H. Zhao, R. Yu and Z. Tang, Multi-shelled $CeO_2$ hollow microspheres as superior photocatalysts for water oxidation, Nanoscale, 6 (2014) 4072-4077.

[7] S. Wang, L. Yi, J. E. Halpert, X. Lai, Y. Liu, H. Cao, R. Yu, D. Wang, and Y. Li, A novel and highly efficient photocatalyst based on P25-graphdiyne nanocomposite, Small, 8 (2012) 265-271.

[8] N. Yang, Y. Liu, H. Wen, Z. Tang, H. Zhao, Y. Li and D. Wang, Photocatalytic Properties of Graphdiyne and Graphene Modified $TiO_2$: From Theory to Experiment, ACS Nano, 7 (2013)1504-1512.

[9] D. Barreca, G. Carraro, V. Gombac, A. Gasparotto, C. Maccato, P. Fornasiero and E. Tondello, Supported metal oxide nanosystems for hydrogen photogeneration: Quo vadis? Adv. Funct. Mater., 21(2011)2611-2623.

[10] R. M. Mohamed, Characterization and catalytic properties of nano-sized Pt metal catalyst on $TiO_2$—$SiO_2$ synthesized by photo-assisted deposition and impregnation methods. Journal of materials processing technology, 209 (2009) 577-583.

[11] T. A. Kandiel, A. A. Ismail, D. W. Bahnemann, Mesoporous $TiO_2$ nanostructures: a route to minimize Pt loading on titania photocatalysts for hydrogen production, Physical Chemistry Chemical Physic, 12(2011)20155-20161.

[12] R. M. Mohamed, and E. Aazam, Synthesis and characterization of P-doped $TiO_2$ thin-films for photocatalytic degradation of butyl benzyl phthalate under visible-light irradiation. Chinese Journal of Catalysis, 34(2013)1267-1273.

[13] A. A. Ismail, T. A. Kandiel, D. W. Bahnemann, Novel (and better?) titania-based photocatalysts: brookite nanorods and mesoporous structures, J. Photochem. Photobiol., A, 216 (2010)183-193.

[14] Z. Jin, X. Zhang, Y. Li, S. Li and G. Lu, 5.1% Apparent quantum efficiency for stable hydrogen generation over eosin-sensitized $CuO/TiO_2$ photocatalyst under visible light irradiation, Catal. Commun., 8 (2007)1267-1273.

[15] R. M. Mohamed, A. Shawky, M. S. Aljandali, Palladium/zinc indium sulfide microspheres: Enhanced photocatalysts prepare methanol under visible light conditions, Journal of the Taiwan Institute of Chemical Engineers 65 (2016) 498-504

[16] R. M. Mohamed, M. A., Salam, Photocatalytic reduction of aqueous mercury (II) using multi-walled carbon nanotubes/Pd—ZnO nanocomposite, Materials Research Bulletin 50 (2014) 85-90.

[17] M. H. Lee, K. Takei, J. Zhang, R. Kapadia, M. Zheng, Y.-Z. Chen, J. Nah, T. S. Matthews, Y.-L. Chueh, J. W. Ager and A. Javey, p-Type InP nanopillar photocathodes for efficient solar-driven hydrogen production, Angew. Chem., Int. Ed., 51 (2012)10760-10764.

[18] R. M. Mohamed, I. A. Mkhalid, E. S. Baeissa, M. A. Al-Rayyani, Photocatalytic degradation of methylene blue by $Fe/ZnO/SiO_2$ nanoparticles under visible light. Journal of Nanotechnology 2012 (2012) 329082.

[19] R. M. Mohamed, I. A. Mkhalid, A. Shawky, A Facile synthesis of $Pt—In_2O_3/BiVO_4$ nanospheres with improved visible-light photocatalytic activity. J Alloys Compd 775(2019)542-548.

[20] J. Yu and J. Ran, Facile preparation and enhanced photocatalytic $H_2$-production activity of $Cu(OH)_2$ cluster modified $TiO_2$, Energy Environ. Sci., 4(2011)1364-1371.

[21] A. Shawky, R. M. Mohamed, I. A. Mkhalid, N. S. Awwad, H. A. Ibrahium, One-pot synthesis of $Mn_3O_4$-coupled $Ag_2WO_4$ nanocomposite photocatalyst for enhanced photooxidative desulfurization of thiophene under visible light irradiation, Applied Nanoscience, 8 (2018) 1179-1188.

[22] H. Tada, T. Mitsui, T. Kiyonaga, T. Akita and K. Tanaka, All-solid-state Z-scheme in CdS—Au—$TiO_2$ three-component nanojunction system, Nat. Mater., 5 (2006)782-786.

[23] H. J. Yun, H. Lee, N. D. Kim, D. M. Lee, S. Yu and J. Yi, A combination of two visible-light responsive photocatalysts for achieving the Z-scheme in the solid state, ACS Nano, 5(2011) 4084-4090.

[24] M. Jakob, H. Levanon and P. V. Kamat, Charge distribution between UV-irradiated $TiO_2$ and gold nanoparticles: Determination of shift in the fermi level, Nano Lett., 2003, 3, 353-358.

[25] V. Subramanian, E. E. Wolf, P. V. Kamat, Catalysis with $TiO_2$/gold nanocomposites. Effect of metal particle size on the fermi level equilibration, J. Am. Chem. Soc., 126 (2004) 4943-4950.

[26] A. Shawky, M. Alhaddad, K. S. Al-Namshah, R. M. Mohamed, N. S. Awwad, Synthesis of Pt-decorated CaTiO3 nanocrystals for efficient photoconversion of nitrobenzene to aniline under visible light, J. Mol. Liq. 304 (2020) 112704.

[27] G. L. Chiarello, M. H. Aguirre and E. Selli, Hydrogen production by photocatalytic steam reforming of methanol on noble metal-modified $TiO_2$, J. Catal., 273 (2010) 182-190.

[28] V. Artero, M. Chavarot-Kerlidou and M. Fontecave, Splitting water with cobalt, Angew. Chem., Int. Ed., 50 (2011)7238-7266.

[29] P. D. Tran, L. Xi, S. K. Batabyal, L. H. Wong, J. Barber, J. S. Chye Loo, Enhancing the photocatalytic efficiency of $TiO_2$ nanopowders for $H_2$ production by using non-noble transition metal co-catalysts, Phys. Chem. Chem. Phys., 14 (2012)11596-11599.

[30] A. Shawky, M. Alhaddad, R. M. M. Mohamed, N. S. Awwad, H. A. Ibrahium, Magnetically separable and visible light-active $Ag/NiCo_2O_4$ nanorods prepared by a simple route for superior photodegradation of atrazine in water, Prog. Nat. Sci. Mater. Int. 30 (2020) 160-167.

[31] H. Yu, J. Yu, B. Cheng, S. Liu Novel preparation and photocatalytic activity of one-dimensional $TiO_2$ hollow structures, Nanotechnology 18 (2007) 065604.

[32] J. Tian, P. Hao, N. Wei, H. Cui, H. Liu, 3D $Bi_2MoO_6$ nanosheet/$TiO_2$ nanobelt heterostructure: enhanced photocatalytic activities and photoelectochemistry performance, ACS Catal. 5 (2015) 4530-4536.

[33] W. Cao, B. Wei, X. Fu, N. Ma, H. Gao, L. Xu, Colored $TiO_2$ hollow spheres for efficient watersplitting photocatalysts, RSC Adv. 6 (2016) 108969.

[34] Q. Jiang, L. Li, J. Bi, S. Liang, M. Liu, Design and Synthesis of $TiO_2$ Hollow Spheres with Spatially Separated Dual Cocatalysts for Efficient Photocatalytic Hydrogen Production, Nanomaterials 7 (2017) 24 M. Xiao, H. Chen, T. Ming, L. Shao, J. Wang, Plasmon-modulated light scattering from gold nanocrystal-decorated hollow mesoporous silica microspheres, ACS Nano 4 (2010) 6565-6572.

[35] M. Retsch, M. Schmelzeisen, H. Butt, E. Thomas, Visible Mie scattering in nonabsorbing hollow sphere powders, Nano Lett. 11 (2011) 1389-1394.

[36] L. Fielding, O. Mykhaylyk, A. Schmid, D. Pontoni, S. Armes, P. Fowler, Visible Mie scattering from hollow silica particles with particulate shells, Chem. Mater. 26 (2014) 1270-1277.

[37] S. Kim, V. Hwang, S. Lee, J. Ha, V. Manoharan, G. Yi, Solution-processable photonic inks of Mie-resonant hollow carbon-silica nanospheres, Small. 15 (2019) 1900931.

[38] X. Yao, Y. Bai, Y. Lee, Z. Qi, X. Liu, Y. Yin, Multicolored hollow carbon-containing titania nanoshells for anti-counterfeiting applications, J. Mater. Chem. C Mater. Opt. Electron. Devices 7 (2019) 14080-14087.

[39] Y. Li, J. Wang, X. Liu, C. Shen, K. Xie, B. Wei, $Au/TiO2$ hollow spheres with synergistic effect of plasmonic enhancement and light scattering for improved dyesensitized solar cells, ACS Appl. Mater. Interfaces 9 (2017) 31691-31698.

[40] F. Xie, Y. Li, J. Dou, J. Wu, M. Wei, Facile Synthesis of $SnO_2$ coated urchin-like $TiO_2$ hollow microspheres as efficient scattering layer for dye-sensitized solar cells, J. Power Sources 336 (2016) 143-149

[41] A. A. Ismail, D. W. Bahnemann, L. Robben, V. Yarovyi, M. Wark, Palladium doped porous titania photocatalysts: Impact of mesoporous order and crystallinity, Chemistry of Materials, 22 (2010) 108-116.

[42] G. Dong, H. Hu, X. Huang, Y. Zhang, Y. Bi, Rapid activation of $Co_3O_4$ cocatalysts with oxygen vacancies on TiO2 photoanodes for efficient water splitting, J. Mater. Chem. A. 6 (2018) 21003-21009.

[43] S. Bala, I. Mondal, A. Goswami, U. Pal, R. Mondal, Co-MOF as a sacrificial template: Manifesting a new Co3O4/TiO2 system with a p-n heterojunction for photocatalytic hydrogen evolution, J. Mater. Chem. A. 3 (2015) 20288-20296.

[44] Q. Zhang, Z. Hai, A. Jian, H. Xu, C. Xue, S. Sang, Synthesis of p-Co3O4/n-TiO2 nanoparticles for overall water splitting under visible light irradiation, Nanomaterials. 6 (2016).

[45] X. R. Zhao, Y. Q. Cao, J. Chen, L. Zhu, X. Qian, A. D. Li, D. Wu, Photocatalytic Properties of Co3O4-Coated TiO2 Powders Prepared by Plasma-Enhanced Atomic Layer Deposition, Nanoscale Res. Lett. 12 (2017).

[46] Z. Shi, L. Lan, Y. Li, Y. Yang, Q. Zhang, J. Wu, G. Zhang, X. Zhao, Co3O4/TiO2 Nanocomposite Formation Leads to Improvement in Ultraviolet-Visible-Infrared-Driven Thermocatalytic Activity Due to Photoactivation and Photocatalysis-Thermocatalysis Synergetic Effect, ACS Sustain. Chem. Eng. 6 (2018) 16503-16514.

[47] Z. Lou, Y. Wang, Y. Yang, Y. Wang, C. Qin, R. Liang, X. Chen, Z. Ye, L. Zhu, Carbon sphere template derived hollow nanostructure for photocatalysis and gas sensing, Nanomaterials. 10 (2020).

[48] B. Yu, F. Meng, M. W. Khan, R. Qin, X. Liu, Synthesis of hollow $TiO_2$@g-C3N4/Co3O4 core-shell microspheres for effective photooxidation degradation of tetracycline and MO, Ceram. Int. 46 (2020) 13133-13143.

[49] G. M. Tomboc, B. T. Gadisa, J. Joo, H. Kim, K. Lee, Hollow Structured Metal Sulfides for Photocatalytic Hydrogen Generation, ChemNanoMat. 6 (2020) 850-869.

[50] Q. Jiang, L. Li, J. Bi, S. Liang, M. Liu, Design and synthesis of Tio2 hollow spheres with spatially separated dual cocatalysts for efficient photocatalytic hydrogen production, Nanomaterials. 7 (2017).

[51] P. She, J. Qin, H. Rao, B. Guan, J. Yu, Spatially separated bimetallic cocatalysts on hollow-structured TiO2 for photocatalytic hydrogen generation, Mater. Chem. Front. 4 (2020) 1671-1678.

[52] B. Fang, Y. Xing, A. Bonakdarpour, S. Zhang, D. P. Wilkinson, Hierarchical $CuO-TiO_2$ Hollow Microspheres for Highly Efficient Photodriven Reduction of $CO_2$ to $CH_4$, ACS Sustainable Chem. Eng. 3(2015)2381-2388.

[53] K. Sing, D. Everett, R. Haul, L. Moscou, R. Pierotti, J. Rouquerol, T. Siemieniewska, Reporting physisorption data for gas/solid systems with special reference to the determination of surface area and porosity. Pure Appl. Chem. 57(1985) 603-619.

[54] Q. Guo, M. Zhang, X. Li, X. Li, H. Li, Y. Lu, X. Song, L. Wang, A novel $CuO/TiO_2$ hollow nanofiber film for non-enzymatic glucose sensing, RSC Adv., 6(2016) 99969-99976.

[55] J. Yu, H. Guo, S. Davis, S. Mann, Fabrication of hollow inorganic microspheres by chemically induced self-transformation. Adv. Funct. Mater. 16(2006) 2035-2041.

[56] E. Topoglidis, C. J. Campbell, A. E. G. Cass and J. R. Durrant, Factors that affect protein adsorption on nano-structured titania films. A novel spectroelectrochemical application to sensing, Langmuir, 17(2001) 7899-7906.

[57] S. Bala, I. Mondal, A. Goswami, U. Pal, R. Mondal, Co-MOF as a sacrificial template: manifesting a new $Co_3O_4/TiO_2$ system with a p-n heterojunction for photocatalytic hydrogen evolution, J. Mater. Chem. A 3 (2015) 20288-20296.

[58] Q. Zhang, Z. Hai, A. Jian, H. Xu, C. Xue, S. Sang, Synthesis of p-Co3O4/n-TiO2 Nanoparticles for Overall-Water Splitting under Visible Light Irradiation, Nanomaterials 6 (2016)138.

[59] I. A. Mkhalid, J. L. G., Fierro, R. M. Mohamed, A. A. Alshahri, Photocatalytic visible-light-driven removal of the herbicide imazapyer using nanocomposites based on mesoporous $TiO_2$ modified with Gd2O3. Appl Nanosci (2020).

[60] H. Adhikari, M. Ghimire, C. K. Ranaweera, S. Bhoyate, R. K. Gupta, J. Alam, S. R. Mishra, Synthesis and electrochemical performance of hydrothermally synthesized $Co_3O_4$ nanostructured particles in presence of urea, J. Alloys Compds 708 (2017) 628-638.

[61] M. Zhang, R. Z. Sun, Y. J. Li, Q. M. Shi, L. H. Xie, J. S. Chen, X. H. Xu, H. X. Shi, W. R. Zhao, High $H_2$ Evolution from quantum Cu(II) nanodot-doped two-dimensional ultrathin $TiO_2$ nanosheets with dominant exposed {001} facets for reforming glycerol with multiple electron transport pathways. J. Phys. Chem. C 120 (2016)10746-10756.

[62] A. Diallo, A. C. Beye, T. B. Doyle, E. Park, M. Maaza, Green synthesis of $Co_3O_4$ nanoparticles via *Aspalathus linearis*: Physical properties, Green Chem. Lett. Rev. 8 (2015) 30-36.

[63] Z. Shi, L. Lan, Y. Li, Y. Yang, Q. Zhang, J. Wu, G. Zhang, X. Zhao, $Co_3O_4/TiO_2$ Nanocomposite Formation Leads to Improvement in Ultraviolet-Visible-Infrared-Driven Thermocatalytic Activity Due to Photoactivation and Photocatalysis-Thermocatalysis Synergetic Effect, ACS Sustainable Chem. Eng. 6 (2018)16503-16514.

[64] X-R. Zhao, Y-Q. Cao, J. Chen, L. Zhu, X. Qian, A-D. Li, D. Wu, Photocatalytic Properties of $Co_3O_4$-Coated $TiO_2$ Powders Prepared by Plasma-Enhanced Atomic Layer Deposition, Nanoscale Research Letters 12 (2017) 497.

[65] P. A. Mangrulkar, M. M. Joshi, S. N. Tijare, V. Polshettiwar, Nano cobalt oxides for photocatalytic hydrogen production, International J. hydrogen energy 37 (2012) 10462-10466.

[66] W-D. Wei, X-Y. Liu, S-C. Cui, J-G. Liu, Loading of $Co_3O_4$ onto Pt-modified nitrogendoped $TiO_2$ nanocomposites promotes photocatalytic hydrogen production, RSC Adv. 7 (2017) 25650-25656.

[67] G. Dong, H. Hu, X. Huang, Y. Zhanga, Y. Bi, Rapid activation of $Co_3O_4$ cocatalysts with oxygen vacancies on $TiO_2$ photoanodes for efficient water splitting. J. Mater. Chem. A 6 (2018) 21003-21009.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of synthesizing $TiO_2/Co_3O_4$ core-shell photocatalysts, comprising:

preparing $SiO_2$ hollow nanospheres via sol-gel synthesis in the presence of a non-ionic surfactant and a cationic surfactant;

adding titanium sec-butoxide to a solution containing the $SiO_2$ hollow nanospheres to provide a first combined sample;

calcinating the first combined sample to provide hollow mesoporous $TiO_2$ nanospheres;

adding cobalt nitrate to a solution comprising the hollow mesoporous $TiO_2$ nanospheres to provide a second combined sample; and calcinating the second combined sample to provide $TiO_2/Co_3O_4$ core-shell photocatalysts.

2. The method of claim 1, wherein the non-ionic surfactant is poloxamer 407.

3. The method of claim 1, wherein the cationic surfactant is hexadecyltrimethylammonium bromide.

* * * * *